US012165578B2

(12) United States Patent
Kim et al.

(10) Patent No.: US 12,165,578 B2
(45) Date of Patent: Dec. 10, 2024

(54) DISPLAY DRIVER

(71) Applicant: Samsung Display Co., Ltd., Yongin-Si (KR)

(72) Inventors: Jongman Kim, Yongin-si (KR); Sangmyeon Han, Yongin-si (KR); Byoungkwan An, Yongin-si (KR); Seungho Park, Yongin-si (KR); Namjae Lim, Yongin-si (KR); Joonhyeok Jeon, Yongin-si (KR)

(73) Assignee: Samsung Display Co., Ltd., Yongin-si (KR)

( * ) Notice: Subject to any disclaimer, the term of this patent is extended or adjusted under 35 U.S.C. 154(b) by 0 days.

(21) Appl. No.: 18/367,483

(22) Filed: Sep. 13, 2023

(65) Prior Publication Data

US 2024/0177655 A1 May 30, 2024

(30) Foreign Application Priority Data

Nov. 28, 2022 (KR) ........................ 10-2022-0161952

(51) Int. Cl.
*G09G 3/3208* (2016.01)

(52) U.S. Cl.
CPC ... *G09G 3/3208* (2013.01); *G09G 2320/0257* (2013.01); *G09G 2340/00* (2013.01); *G09G 2350/00* (2013.01)

(58) Field of Classification Search
CPC ......... G09G 3/3208; G09G 2320/0257; G09G 2340/00; G09G 2350/00; G09G 3/3266; G09G 3/3225; G09G 3/2044
USPC .......................................................... 345/214
See application file for complete search history.

(56) References Cited

U.S. PATENT DOCUMENTS

| | | | | |
|---|---|---|---|---|
| 9,786,221 | B2 | 10/2017 | Bae et al. | |
| 10,262,582 | B2 | 4/2019 | Han | |
| 11,238,787 | B2 | 2/2022 | An | |
| 2019/0221158 | A1* | 7/2019 | An | G09G 3/3266 |
| 2021/0082341 | A1* | 3/2021 | Cook | G09G 3/2044 |
| 2022/0139309 | A1* | 5/2022 | Ok | G09G 3/3225<br>345/214 |

FOREIGN PATENT DOCUMENTS

| | | | |
|---|---|---|---|
| JP | 4942808 | B2 | 5/2012 |
| KR | 10-2019-0088150 | A | 7/2019 |
| KR | 10-2097633 | B1 | 4/2020 |
| KR | 10-2320306 | B1 | 11/2021 |

* cited by examiner

*Primary Examiner* — Abdul-Samad A Adediran
(74) *Attorney, Agent, or Firm* — Innovation Counsel LLP

(57) ABSTRACT

A display driver includes a nonvolatile memory, an encoder, a decoder, and a compensator. The nonvolatile memory is configured to store accumulated stress data and compensation data corresponding to the accumulated stress data. The encoder is configured to encode the compensation data received from the nonvolatile memory to generate encoded compensation data. The decoder is configured to decode the encoded compensation data to generate decoded compensation data. The compensator is configured to process input image data based on the decoded compensation data and generate accumulated stress data.

22 Claims, 12 Drawing Sheets

DISPLAY DRIVER

PRIORITY STATEMENT

This application claims priority, under 35 U.S.C. § 119, to Korean Patent Application No. 10-2022-0161952 filed on Nov. 28, 2022 in the Korean Intellectual Property Office (KIPO), the content of which is herein incorporated by reference in its entirety.

BACKGROUND

1. Field

The present disclosure relates to a display driver. More particularly, the present inventive concept relates to a display driver for compressing at least one of accumulated stress data and compensation data used for afterimage compensation to overcome a bandwidth limitation of a memory.

2. Description of the Related Art

Generally, a display apparatus includes a display panel and a display panel driver. The display panel includes a plurality of gate lines, a plurality of data lines and a plurality of pixels. The display driver includes a gate driver and a data driver. The gate driver outputs gate signals to the gate lines. The data driver outputs data voltages to the data lines. The display driver further includes a driving controller controlling an operation of the gate driver and an operation of the data driver. The display driver may further include a volatile memory and a nonvolatile memory.

The driving controller may perform afterimage compensation. Compensation data for each pixel may be required for the afterimage compensation. The compensation data for each pixel may be calculated based on accumulated stress data for each pixel.

As a resolution of the display panel increases and a bit depth of the accumulated stress data increases, the amount of data processed in the volatile memory in real time may greatly increase. The amount of data processed in the volatile memory may be determined according to a bandwidth of the volatile memory.

Due to a bandwidth limitation of the volatile memory, resolutions of the compensation data and the accumulated stress data may be constrained and, as a result, the quality of afterimage compensation may be reduced. Thus, the display quality of the display panel may be compromised.

While more memory can be added to provide extra bandwidth, adding memory increases manufacturing cost of the display apparatus.

SUMMARY

Embodiments of the present inventive concept provide a display driver encoding at least one of accumulated stress data and compensation data used for afterimage compensation to overcome the bandwidth limitation of a memory.

In an embodiment of a display driver according to the present inventive concept, the display driver includes a first memory, an encoder, a decoder, and a compensator. The first memory is configured to store accumulated stress data and compensation data corresponding to the accumulated stress data. The encoder is configured to receive the compensation data from the first memory and generate encoded compensation data. The decoder is configured to receive the encoded compensation data and generate decoded compensation data. The compensator is configured to process an afterimage of input image data based on the decoded compensation data and generate accumulated stress data.

In an embodiment, the display driver may further include a volatile memory. The volatile memory may include a second compensator configured to store the encoded compensation data, and an accumulator configured to store the accumulated stress data.

In an embodiment, when the encoder operates N:1 encoding operation, the decoder operates 1:N decoding operation, and a size of the decoded compensation data inputted to the compensator is B, a size of the compensation data stored in the first memory may be B and the encoded compensation data stored in the second compensator may be B/N. N may be a real number greater than one.

In an embodiment, when a size of the accumulated stress data stored in an accumulator is A, a size of the accumulated stress data stored in the first memory may be A.

In an embodiment, the encoder may be configured to encode the compensation data between a power on timing when a display apparatus is turned on and a memory ready timing when an accumulator is activated.

In an embodiment, the decoder may be configured to decode the encoded compensation data in an active period during which data are written to pixels of a display panel.

In an embodiment, the encoder may be configured to perform an encoding operation by controlling a quantization factor such that a code length of output data does not exceed a predetermined code length.

In an embodiment, the encoder may include a quantizer configured to store a data difference between adjacent pixels of input data, a rate controller configured to generate the quantization factor based on the code length and the predetermined code length of the output data and a predictor configured to generate a prediction value based on the quantization factor and the input data.

In an embodiment, the encoder may further include an operator configured to adjust a length of the input data based on the prediction value and output the input data to the quantizer.

In an embodiment of a display driver according to the present inventive concept, the display driver includes an encoder, a first memory, a decoder, and a compensator. The encoder is configured to encode accumulated stress data to generate encoded accumulated stress data. The first memory is configured to store the encoded accumulated stress data and encoded compensation data corresponding to the encoded accumulated stress data. The decoder is configured to decode the encoded compensation data to generate decoded compensation data. The compensator is configured to process input image data based on the decoded compensation data and generate accumulated stress data by accumulating the input image data that is received.

In an embodiment, the display driver may further include a second compensator configured to store the encoded compensation data received from the first memory. When the encoder operates N:1 encoding operation, the decoder operates 1:N decoding operation, and a size of the decoded compensation data inputted to the compensator is B, a size of the encoded compensation data stored in the first memory may be B/N and the encoded compensation data stored in the second compensator may be B/N. N ma real number greater than one.

In an embodiment, when a size of the accumulated stress data stored in an accumulator is A, a size of the encoded accumulated stress data stored in the first memory may be A/N.

In an embodiment, the encoder may be configured to encode the accumulated stress data in a blank period between active periods during which data are written to pixels of a display panel.

In an embodiment, the decoder may be configured to decode the encoded compensation data in the active period.

In an embodiment of a display driver according to the present inventive concept, the display driver includes a first memory, a decoder, and a compensator. The first memory includes an accumulation memory configured to store accumulated stress data, a compensation memory configured to store compensation data corresponding to the accumulated stress data and an encoder configured to encode the compensation data of the compensation memory to generate encoded compensation data. The decoder is configured to decode the encoded compensation data to generate decoded compensation data. The compensator is configured to process input image data based on the decoded compensation data and generate accumulated stress data by accumulating the input image data that is received.

In an embodiment, the display driver may further include a second compensator configured to receive the encoded compensation data from the first memory and to store the encoded compensation data. When the encoder operates N:1 encoding operation, the decoder operates 1:N decoding operation, and a size of the decoded compensation data inputted to the compensator is B, a size of the encoded compensation data generated by the encoder and stored in the compensation memory of the first memory may be B/N and the encoded compensation data stored in the second compensator may be B/N. N is a real number greater than one.

In an embodiment, when a size of the accumulated stress data stored in an accumulator is A, a size of the accumulated stress data stored in the accumulation memory of the first memory may be A.

In an embodiment, the encoder may be configured to encode the compensation data regardless of an operation timing of a display panel. The decoder may be configured to decode the encoded compensation data in an active period during which data are written to pixels of the display panel.

In an embodiment of a display driver according to the present inventive concept, the display driver includes a compensator, an encoder, a volatile memory and a first memory. The afterimage compensator is configured to process input image data. The encoder is configured to encode accumulated stress data generated by accumulating the input image data that is received by the compensator to generate encoded accumulated stress data. The volatile memory is configured to store the encoded accumulated stress data. The first memory is configured to store the encoded accumulated stress data received from the volatile memory and encoded compensation data corresponding to the encoded accumulated stress data. The volatile memory is configured to receive the encoded compensation data from the first memory. The display driver further includes a decoder configured to decode the encoded compensation data received from the volatile memory to generate decoded compensation data.

In an embodiment, when the encoder operates N:1 encoding operation, the decoder operates 1:N decoding operation, and a size of the decoded compensation data inputted to the compensator is B, a size of the encoded compensation data stored in the first memory may be B/N and the encoded compensation data stored in the volatile memory may be B/N. N may be a real number greater than one.

In an embodiment, when a size of the accumulated stress data generated by accumulating the input image data is A, a size of the encoded accumulated stress data stored in the first memory may be A/N and a size of the encoded accumulated stress data stored in the volatile memory may be A/N.

In an embodiment, the encoder may be configured to encode the accumulated stress data in an active period during which data are written to pixels of a display panel. The decoder may be configured to decode the encoded compensation data in the active period.

According to the display driver, at least one of the accumulated stress data and the compensation data used for afterimage compensation may be encoded and the afterimage compensator may operate the afterimage compensation using the decoded compensation data. Thus, the limitation of the bandwidth of the volatile memory may be overcome.

Accordingly, any constraint on the resolution of the compensation data and the accumulated stress data due to the bandwidth limitation of the volatile memory may be prevented. Thus, the quality of the afterimage compensation may be maintained and the deterioration of the display quality of the display panel may be reduced.

In addition, as the disclosure overcomes the memory bandwidth limitation without adding volatile memories, manufacturing cost of the display apparatus may not be increased.

BRIEF DESCRIPTION OF THE DRAWINGS

The above and other features and advantages of the present inventive concept will become more apparent by describing in detailed embodiments thereof with reference to the accompanying drawings, in which.

DETAILED DESCRIPTION OF THE INVENTIVE CONCEPT

Hereinafter, the present inventive concept will be explained in detail with reference to the accompanying drawings.

Figure 1:
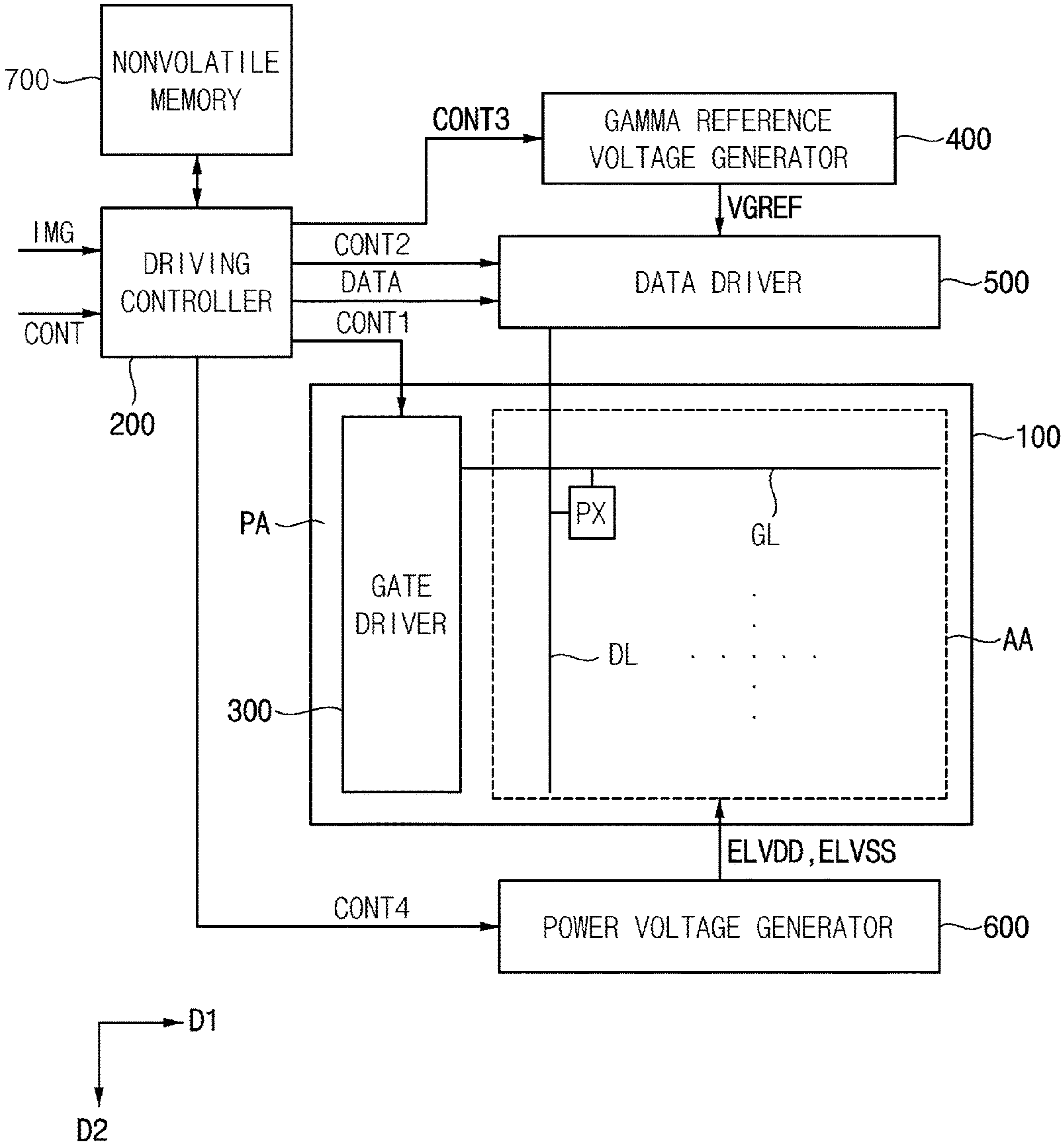
FIG. 1 is a block diagram illustrating a display apparatus according to an embodiment of the present inventive concept.

FIG. 1 is a block diagram illustrating a display apparatus according to an embodiment of the present inventive concept.

Referring to FIG. 1, the display apparatus includes a display panel 100 and a display driver. The display driver includes a driving controller 200, a gate driver 300, a gamma reference voltage generator 400 and a data driver 500. The display driver may further include a power voltage generator 600. The display apparatus may further include a nonvolatile memory 700. In addition, the display apparatus may further include a volatile memory (not explicitly shown). In some cases, the volatile memory may be disposed in the driving controller 200.

The driving controller 200 and the data driver 500 may be integrally formed. In some embodiments, the driving controller 200, the gamma reference voltage generator 400 and the data driver 500 may be integrally formed. In other embodiments, the driving controller 200, the gamma reference voltage generator 400, the data driver 500 and the power voltage generator 600 may be integrally formed. A driving module including at least the driving controller 200 and the data driver 500 which are integrally formed may be called to a timing controller embedded data driver (TED).

The display panel 100 has a display region AA on which an image is displayed and a peripheral region PA adjacent to the display region AA.

For example, in the present embodiment, the display panel 100 may be an organic light emitting diode display panel including an organic light emitting diode. For example, the display panel 100 may be a quantum dot organic light emitting diode display panel including an organic light emitting diode and a quantum dot color filter. For example, the display panel 100 may be a quantum dot nano light emitting diode display panel including a nano light emitting diode and a quantum dot color filter.

The display panel 100 includes a plurality of gate lines GL, a plurality of data lines DL and a plurality of pixels PX connected to the gate lines GL and the data lines DL. The gate lines GL may extend in a first direction D1 and the data lines DL may extend in a second direction D2 crossing the first direction D1.

The driving controller 200 receives input image data IMG and an input control signal CONT from an external apparatus (e.g. a host or an application processor). The input image data IMG may include red image data, green image data and blue image data. The input image data IMG may include white image data. The input image data IMG may include magenta image data, yellow image data and cyan image data. The input control signal CONT may include a master clock signal and a data enable signal. The input control signal CONT may further include a vertical synchronizing signal and a horizontal synchronizing signal.

The driving controller 200 generates a first control signal CONT1, a second control signal CONT2, a third control signal CONT3 and a data signal DATA based on the input image data IMG and the input control signal CONT.

The driving controller 200 generates the first control signal CONT1 for controlling an operation of the gate driver 300 based on the input control signal CONT, and outputs the first control signal CONT1 to the gate driver 300. The first control signal CONT1 may further include a vertical start signal and a gate clock signal.

The driving controller 200 generates the second control signal CONT2 for controlling an operation of the data driver 500 based on the input control signal CONT, and outputs the second control signal CONT2 to the data driver 500. The second control signal CONT2 may include a horizontal start signal and a load signal.

The driving controller 200 generates the data signal DATA based on the input image data IMG. The driving controller 200 outputs the data signal DATA to the data driver 500.

The driving controller 200 generates the third control signal CONT3 for controlling an operation of the gamma reference voltage generator 400 based on the input control signal CONT, and outputs the third control signal CONT3 to the gamma reference voltage generator 400.

The driving controller 200 may generate a fourth control signal CONT4 for controlling an operation of the power voltage generator 600 based on the input image data IMG and the input control signal CONT, and outputs the fourth control signal CONT4 to the power voltage generator 600.

The gate driver 300 generates gate signals driving the gate lines GL in response to the first control signal CONT1 received from the driving controller 200. The gate driver 300 outputs the gate signals to the gate lines GL. For example, the gate driver 300 may sequentially output the gate signals to the gate lines GL.

In an embodiment, the gate driver 300 may be integrated on the peripheral region PA of the display panel 100.

The gamma reference voltage generator 400 generates a gamma reference voltage VGREF in response to the third control signal CONT3 received from the driving controller 200. The gamma reference voltage generator 400 provides the gamma reference voltage VGREF to the data driver 500. The gamma reference voltage VGREF is used to convert the data signal DATA to the data voltage having an analog type.

In an embodiment, the gamma reference voltage generator 400 may be disposed in the driving controller 200, or in the data driver 500.

The data driver 500 receives the second control signal CONT2 and the data signal DATA from the driving controller 200, and receives the gamma reference voltages VGREF from the gamma reference voltage generator 400. The data driver 500 converts the data signal DATA into data voltages having an analog type using the gamma reference voltages VGREF. The data driver 500 outputs the data voltages to the data lines DL.

The power voltage generator 600 may generate a high power voltage ELVDD and output the high power voltage ELVDD to the display panel 100. The power voltage generator 600 may generate a low power voltage ELVSS and output the low power voltage ELVSS to the display panel 100. In addition, the power voltage generator 600 may generate a gate driving voltage for driving the gate driver 300 and output the gate driving voltage to the gate driver 300. In addition, the power voltage generator 600 may generate a data driving voltage for driving the data driver 500 and output the data driving voltage to the data driver 500. For example, the high power voltage ELVDD may be a high power voltage applied to the pixel PX of the display panel 100 and the low power voltage ELVSS may be a low power voltage applied to the pixel PX of the display panel 100.

The nonvolatile memory 700 may store accumulated stress data of the pixels PX of the display panel 100 and compensation data corresponding to the accumulated stress data. The accumulated stress data represent degrees of deterioration of the pixels PX. The accumulated stress data may be stored in the nonvolatile memory 700 so as not to be erased when the display apparatus is turned off. The accumulated stress data may be accumulated raw data which are accumulated for afterimage compensation. The compensation data may be generated based on the accumulated stress data. The compensation data may be data for generating compensation values used for the afterimage compensation.

Figure 2:
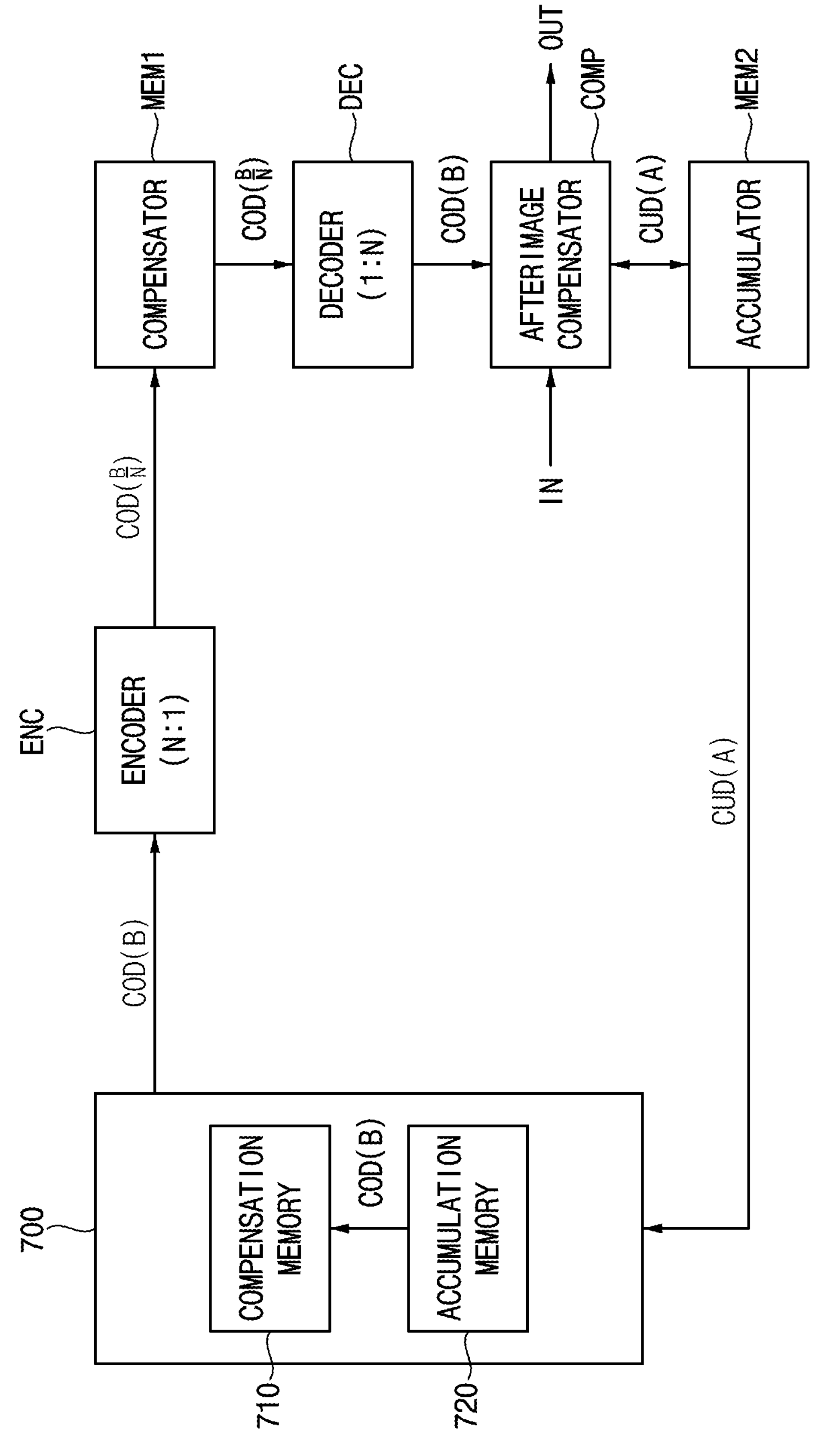
FIG. 2 is a block diagram illustrating a display driver of FIG. 1.
Figure 3:
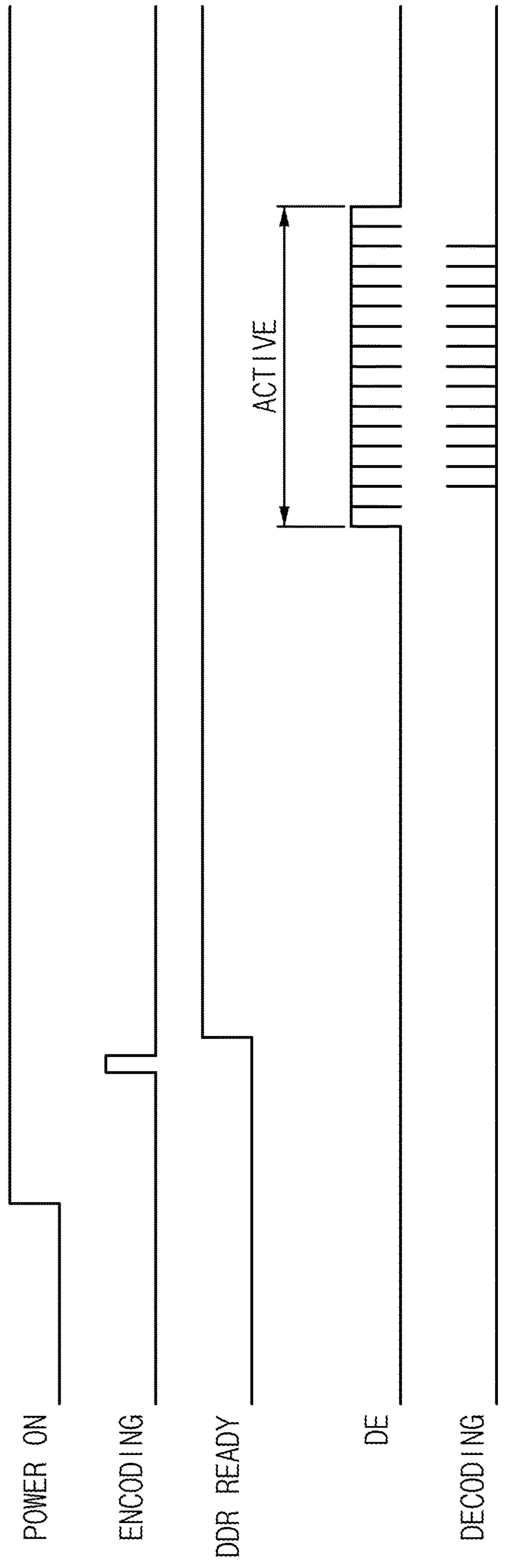
FIG. 3 is a timing diagram illustrating operation timings of an encoder and a decoder of FIG. 2.

FIG. 2 is a block diagram illustrating a display driver of FIG. 1. FIG. 3 is a timing diagram illustrating operation timings of an encoder ENC and a decoder DEC of FIG. 2.

Referring to FIGS. 1 to 3, the display driver may include the nonvolatile memory 700, the encoder ENC, a compensator MEM1, the decoder DEC, an afterimage compensator COMP and an accumulator MEM2.

The nonvolatile memory 700 may receive accumulated stress data CUD(A) from the accumulator MEM2. The nonvolatile memory 700 may store the accumulated stress data CUD(A) and compensation data COD(B) corresponding to the accumulated stress data CUD(A). The nonvolatile memory 700 may output the compensation data COD(B) to the encoder ENC.

For example, the nonvolatile memory 700 may include a compensation memory 710 storing the compensation data COD(B) and an accumulation memory 720 storing the accumulated stress data CUD(A). The compensation memory 710 and the accumulation memory 720 may refer to areas allocated within the same memory or may refer to different memories.

The encoder ENC may receive the compensation data COD(B) from the nonvolatile memory 700. The encoder ENC may encode the compensation data COD(B) to generate encoded compensation data COD(B/N). The encoder ENC may output the encoded compensation data COD(B/N) to the compensator MEM1. For example, the encoder ENC may operate N:1 encoding operation. Herein, N is a real number greater than one. For example, N may be an integer greater than one.

The compensator MEM1 may receive the encoded compensation data COD(B/N) from the encoder ENC. The compensator MEM1 may store the encoded compensation data COD(B/N). The compensator MEM1 may output the encoded compensation data COD(B/N) to the decoder DEC.

The decoder DEC may receive the encoded compensation data COD(B/N) from the compensator MEM1. The decoder DEC may decode the encoded compensation data COD(B/N) to generate decoded compensation data COD(B). The decoder DEC may output the decoded compensation data COD(B) to the afterimage compensator COMP.

The afterimage compensator COMP may receive the decoded compensation data COD(B) from the decoder DEC. The afterimage compensator COMP may compensate the input image data IN based on the decoded compensation data COD(B) to generate output image data OUT. For example, the afterimage compensator COMP may add compensation values of the decoded compensation data COD(B) to the input image data IN to generate the output image data OUT. For example, the afterimage compensator COMP may operate the afterimage compensation in a unit of the pixel PX.

The accumulator MEM2 may store the accumulated stress data CUD(A) generated by accumulating the input image data IN received by the afterimage compensator COMP. The accumulator MEM2 may output the accumulated stress data CUD(A) to the nonvolatile memory 700.

The display driver may further include the volatile memory. The compensator MEM1 and the accumulator MEM2 may be included in the volatile memory. The compensator MEM1 may be a compensation area included in the volatile memory and the accumulator MEM2 may be an accumulation area included in the volatile memory. Alternatively, the compensator MEM1 may be included in a first volatile memory and the accumulator MEM2 may be included in a second volatile memory different from the first volatile memory.

The encoder ENC may operate the N:1 encoding operation, the decoder DEC may operate 1:N decoding operation, a size of the decoded compensation data may be B, a size of the compensation data stored in the nonvolatile memory 700 may be B and the encoded compensation data stored in the compensator MEM1 may be B/N.

As such, the size of the encoded compensation data received to the compensator MEM1 of the volatile memory is B/N so that the bandwidth of the compensator MEM1 may be reduced by 1/N compared to a case where the N:1 encoding operation is not operated.

When a size of the accumulated stress data stored in the accumulator MEM2 is A, a size of the accumulated stress data stored in the nonvolatile memory 700 may be A.

As such, the accumulated stress data may be stored in the nonvolatile memory 700 without reducing the size so that the accumulated raw data accumulated for the after image compensation may be well maintained.

As shown in FIG. 3, in the present embodiment, the encoder ENC may encode the compensation data COD(B) between a power on timing POWER ON when the display apparatus is turned on and a memory ready timing DDR READY when the accumulator MEM2 is activated.

In addition, the decoder DEC may decode the encoded compensation data COD(B/N) in an active period ACTIVE when the data are written to the pixels PX of the display panel 100. For example, the decoder DEC may decode the encoded compensation data COD(B/N) in the active period ACTIVE in synchronization with a data enable signal DE.

Figure 4:
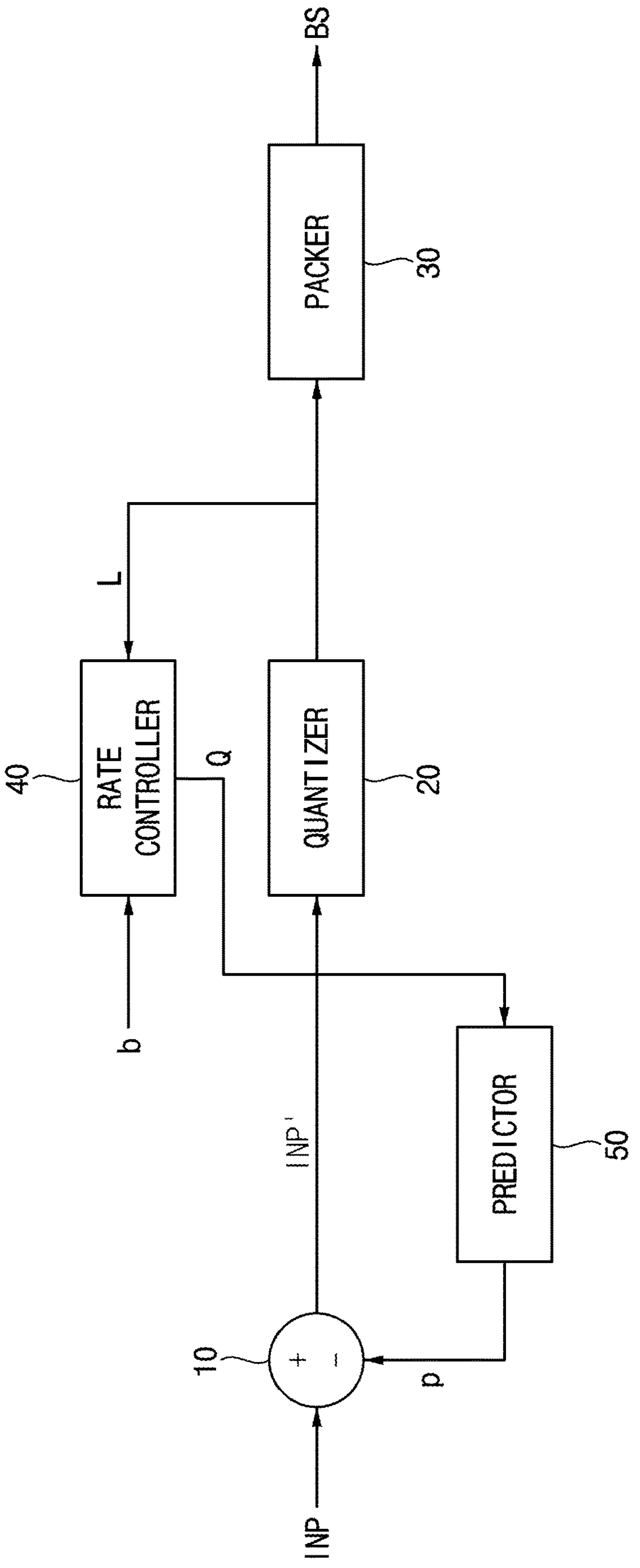
FIG. 4 is a block diagram illustrating the encoder of FIG. 2.
Figure 5A:
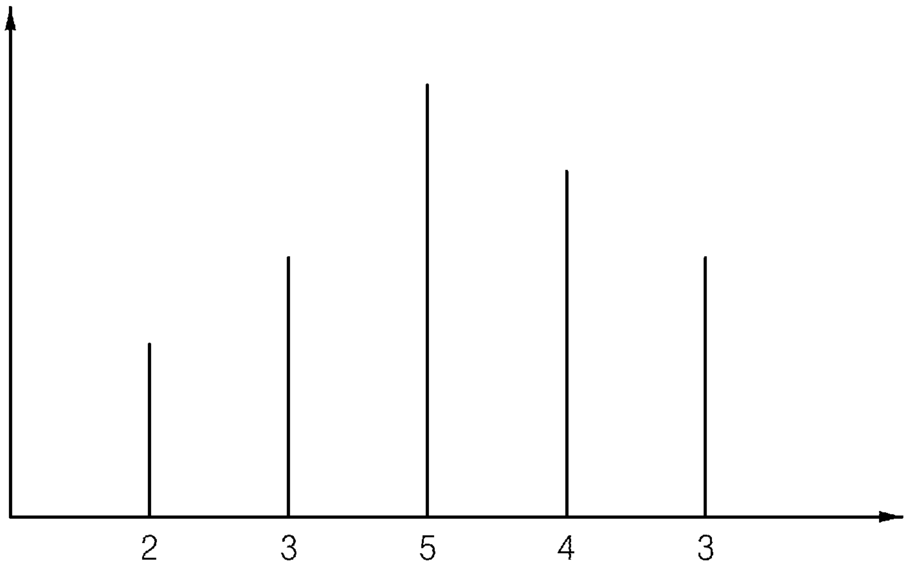
FIGS. 5A and 5B are graphs illustrating an operation of a quantizer of FIG. 4.
Figure 5B:
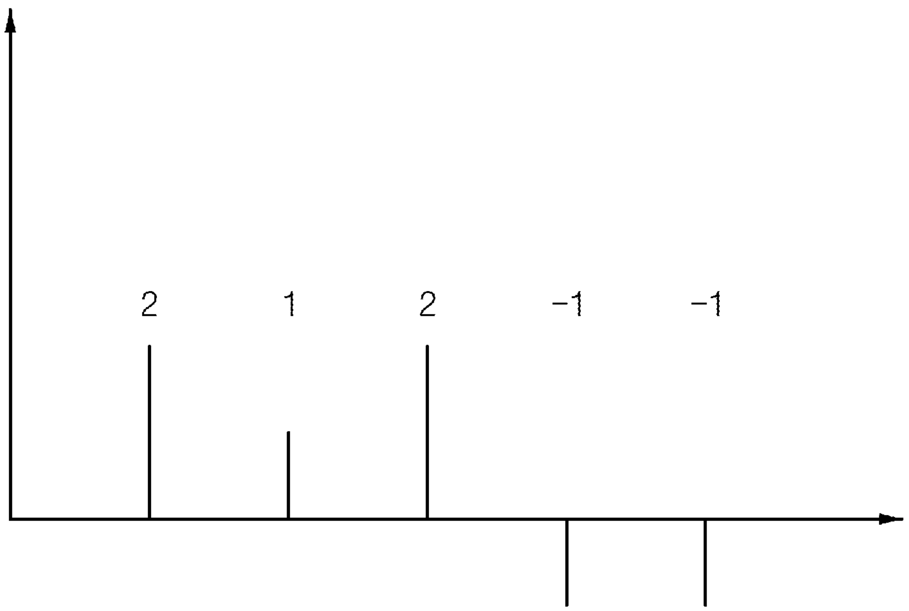

FIG. 4 is a block diagram illustrating the encoder ENC of FIG. 2. FIGS. 5A and 5B are graphs illustrating an operation of a quantizer 20 of FIG. 4.

Referring to FIGS. 1 to 5B, the encoder ENC may operate the encoding operation by controlling a quantization factor Q such that a code length L of output data BS does not exceed a predetermined expected code length b.

For example, the encoder ENC may include an operator 10, the quantizer 20, a packer 30, a rate controller 40 and a predictor 50.

The operator 10 may receive input data INP and a prediction value p, may adjust a length of the input data INP based on the prediction value p to may output the adjusted input data INP' having the adjusted length to the quantizer 20.

The quantizer 20 may compress the adjusted input data INP' by storing a data difference between adjacent pixels of the adjusted input data INP', rather than storing pixel data of the adjusted input data INP; as it is. The quantizer 20 may output the compressed data to the packer 30.

The packer 30 may change a format of the compressed data into a bit stream form to generate output data BS.

The rate controller 40 may generate the quantization factor Q based on the code length L and the expected code length b of the output data BS. For example, when the quantization factor Q is one, a quantization degree (a compression degree) of the adjusted input data INP' may be maintained. For example, when the quantization factor Q is greater than one, the quantization degree (the compression degree) of the adjusted input data INP' may be increased.

For example, when the code length L of the output data BS increases, the rate controller 40 may increase the quantization factor Q.

The predictor 50 may generate the prediction value p based on the quantization factor Q and the input data INP. The predictor 50 may predict a current compression status based on the quantization factor Q and the input data INP and accordingly, generate the prediction value p and output the prediction value p to the operator 10.

For example, when the code length L of the output data BS increases and the quantization factor Q increases, the predictor 50 may generate a negative prediction value p so that the length of the input data INP may be adjusted to be shortened.

FIG. 5B represents an example in which the data of FIG. 5A are quantized by the quantizer 20. The input data INP may have values of 2, 3, 5, 4 and 3, and the data quantized by the quantizer 20 may have values of 2 (change in going from zero), 1 (change in going from 2 to 3), 2 (change in going from 3 to 5), −1 (change in going from 5 to 4), and −1 (change in going from 4 to 3).

In this way, the quantizer 20 may compress the input data INP.

In addition, for example, when the length of the input data INP needs to be reduced in the operator 10, the length of the input data INP may be divided by 2. When the input data INP have values of 2, 3, 5, 4 and 3, the operator 10 may generate values of 1, 1.5, 2.5, 2 and 1.5.

According to the present embodiment, at least one of the accumulated stress data CUD and the compensation data COD used for afterimage compensation may be encoded and the afterimage compensator COMP may operate on the afterimage using the decoded compensation data. Thus, the bandwidth limitation of the volatile memory MEM1 and MEM2 may be overcome.

Accordingly, any constraint on the resolution of the compensation data COD and the accumulated stress data CUD due to the bandwidth limitation of the volatile memory MEM1 and MEM2 may be prevented. Thus, the quality of the afterimage compensation may be maintained and the deterioration of the display quality of the display panel 100 may be prevented.

In addition, the number of the volatile memories MEM1 and MEM2 may not be increased to overcome the bandwidth limitation of the volatile memory MEM1 and MEM2 so that the manufacturing cost of the display apparatus may not be increased.

Figure 6:
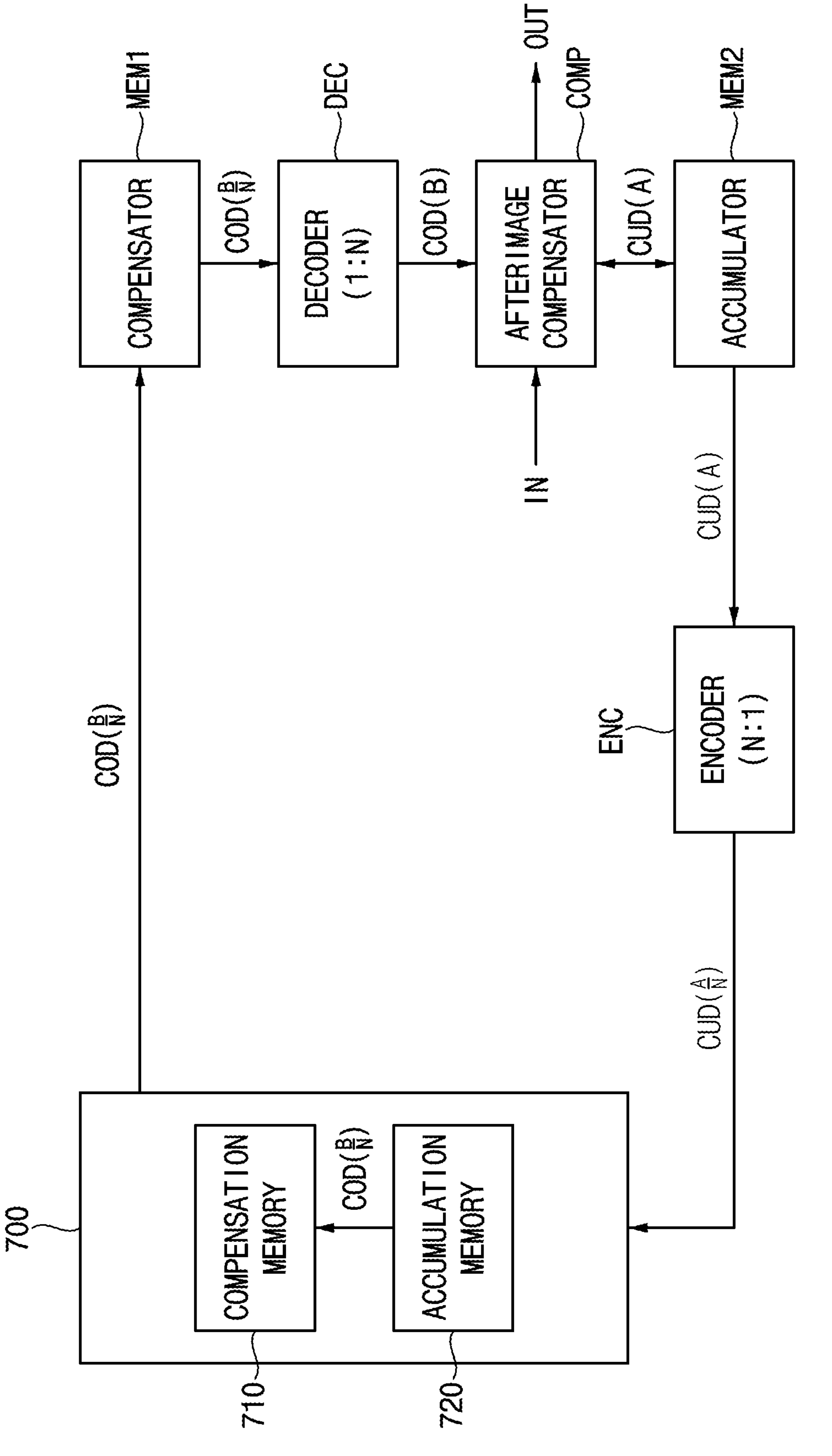
FIG. 6 is a block diagram illustrating a display driver of a display apparatus according to an embodiment of the present inventive concept.
Figure 7:
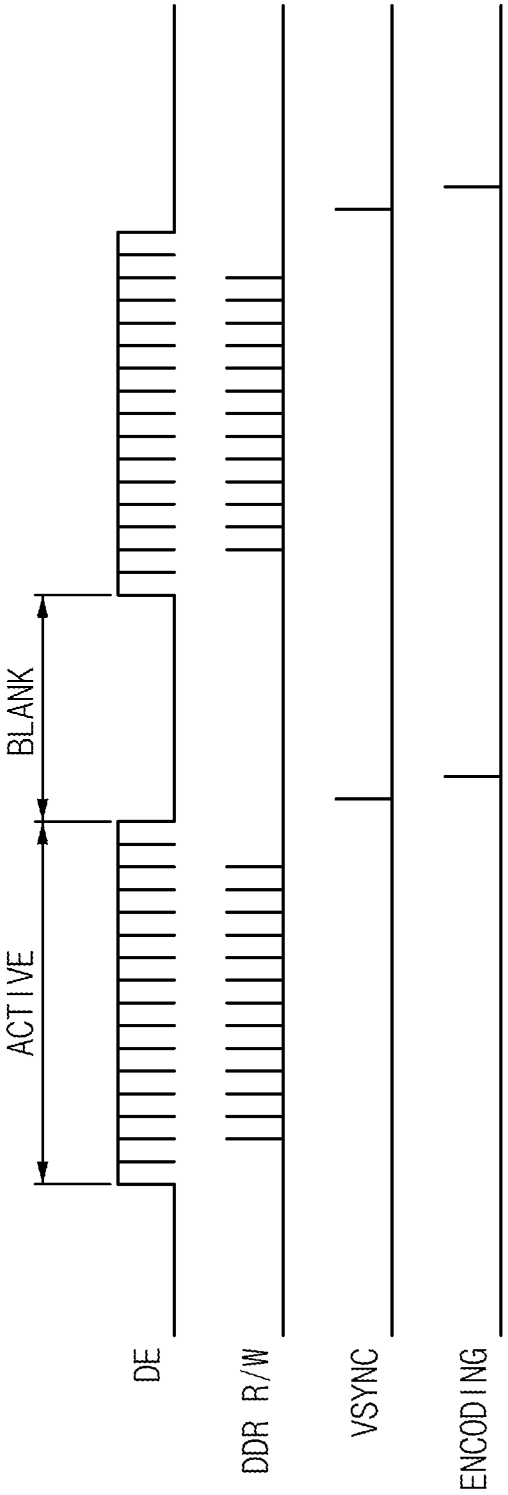
FIG. 7 is a timing diagram illustrating operation timings of an encoder and a decoder of FIG. 6.

FIG. 6 is a block diagram illustrating a display driver of a display apparatus according to an embodiment of the present inventive concept. FIG. 7 is a timing diagram illustrating operation timings of an encoder ENC and a decoder DEC of FIG. 6.

The display apparatus according to the present embodiment is substantially the same as the display apparatus of the previous embodiment explained referring to FIGS. 1 to 5B except for the position and the operation of the encoder. Thus, the same reference numerals will be used to refer to the same or like parts as those described in the previous embodiment of FIGS. 1 to 5B and any repetitive explanation concerning the above elements will be omitted.

Referring to FIGS. 1 and 4 to 7, the display driver may include a nonvolatile memory 700, an encoder ENC, a compensator MEM1, a decoder DEC, an afterimage compensator COMP and an accumulator MEM2.

The encoder ENC may encode the accumulated stress data CUD(A) which are generated by accumulating input image data IN to generate encoded accumulated stress data CUD(A/N). The encoder ENC may output the encoded accumulated stress data CUD(A/N) to the nonvolatile memory 700. For example, the encoder ENC may operate N:1 encoding operation. Herein, N is a real number greater than one. For example, N may be an integer greater than one.

A structure and an operation of the encoder ENC of FIG. 4 may be applied to the present embodiment.

The nonvolatile memory 700 may receive the encoded accumulated stress data CUD(A/N) from the encoder ENC. The nonvolatile memory 700 may store the encoded accumulated stress data CUD(A/N) and encoded compensation data COD(B/N) corresponding to the encoded accumulated stress data CUD(A/N). The nonvolatile memory 700 may output the encoded compensation data COD(B/N) to the compensator MEM1.

For example, the nonvolatile memory 700 may include a compensation memory 710 storing the encoded compensation data COD(B/N) and an accumulation memory 720 storing the encoded accumulated stress data CUD(A/N). The compensation memory 710 and the accumulation memory 720 may refer to areas allocated within the same memory or may refer to different memories.

The compensator MEM1 may receive the encoded compensation data COD(B/N) from the nonvolatile memory 700. The compensator MEM1 may store the encoded compensation data COD(B/N). The compensator MEM1 may output the encoded compensation data COD(B/N) to the decoder DEC.

The decoder DEC may receive the encoded compensation data COD(B/N) from the compensator MEM1. The decoder DEC may decode the encoded compensation data COD(B/N) to generate decoded compensation data COD(B). The decoder DEC may output the decoded compensation data COD(B) to the afterimage compensator COMP.

The afterimage compensator COMP may receive the decoded compensation data COD(B) from the decoder DEC. The afterimage compensator COMP may operate on the input image data IN based on the decoded compensation data COD(B) to generate output image data OUT. For example, the afterimage compensator COMP may add compensation values of the decoded compensation data COD(B) to the input image data IN to generate the output image data OUT. For example, the afterimage compensator COMP may perform the afterimage compensation on a unit of the pixel PX.

The accumulator MEM2 may store the accumulated stress data CUD(A) generated by accumulating the input image data IN inputted to the afterimage compensator COMP. The accumulator MEM2 may output the accumulated stress data CUD(A) to the encoder ENC.

The display driver may further include the volatile memory. The compensator MEM1 and the accumulator MEM2 may be included in the volatile memory. Alternatively, the compensator MEM1 may be included in a first volatile memory and the accumulator MEM2 may be included in a second volatile memory different from the first volatile memory.

The encoder ENC may apply the N:1 encoding operation, the decoder DEC may apply the 1:N decoding operation, a size of the decoded compensation data may be B, a size of the encoded compensation data stored in the nonvolatile memory 700 may be B/N and the encoded compensation data stored in the compensator MEM1 may be B/N.

As such, the size of the encoded compensation data received to the compensator MEM1 of the volatile memory is B/N so that the bandwidth of the compensator MEM1 may be reduced by 1/N compared to a case where the N:1 encoding operation is not applied.

When a size of the accumulated stress data stored in the accumulator MEM2 is A, a size of the encoded accumulated stress data stored in the nonvolatile memory 700 may be A/N.

As such, the encoded accumulated stress data CUD(A/N) and the encoded compensation data COD(B/N) are stored in the nonvolatile memory 700 so that the size of the nonvolatile memory 700 may be reduced.

As shown in FIG. 7, in the present embodiment, the encoder ENC may encode the accumulated stress data CUD(A) in a blank period BLANK between active periods ACTIVE when data are written to the pixels PX of the display panel 100. For example, the encoder ENC may encode the accumulated stress data CUD(A) in the blank period BLANK in synchronization with a vertical synchronization signal VSYNC.

For a real-time encoding, the accumulated stress data CUD(A) may be encoded in the blank period BLANK. In one blank period BLANK, accumulated stress data CUD(A) for pixels connected to one gate line or two gate lines may be encoded.

In addition, the decoder DEC may decode the encoded compensation data COD(B/N) in the active period ACTIVE when the data are written to the pixels PX of the display panel 100. For example, the decoder DEC may decode the encoded compensation data COD(B/N) in the active period ACTIVE in synchronization with a data enable signal DE.

According to the present embodiment, at least one of the accumulated stress data CUD and the compensation data COD used for afterimage compensation may be encoded and the afterimage compensator COMP may operate the afterimage compensation using the decoded compensation data. Thus, the bandwidth limitation of the volatile memory MEM1 and MEM2 may be overcome.

Accordingly, any constraint on the resolution of the compensation data COD and the accumulated stress data CUD due to the bandwidth limitation of the volatile memory MEM1 and MEM2 may be prevented. Thus, the quality of the afterimage compensation may be maintained and the deterioration of the display quality of the display panel 100 may be prevented.

In addition, the number of the volatile memories MEM1 and MEM2 may not be increased to overcome the bandwidth limitation of the volatile memory MEM1 and MEM2 so that the manufacturing cost of the display apparatus may not be increased.

Figure 8:
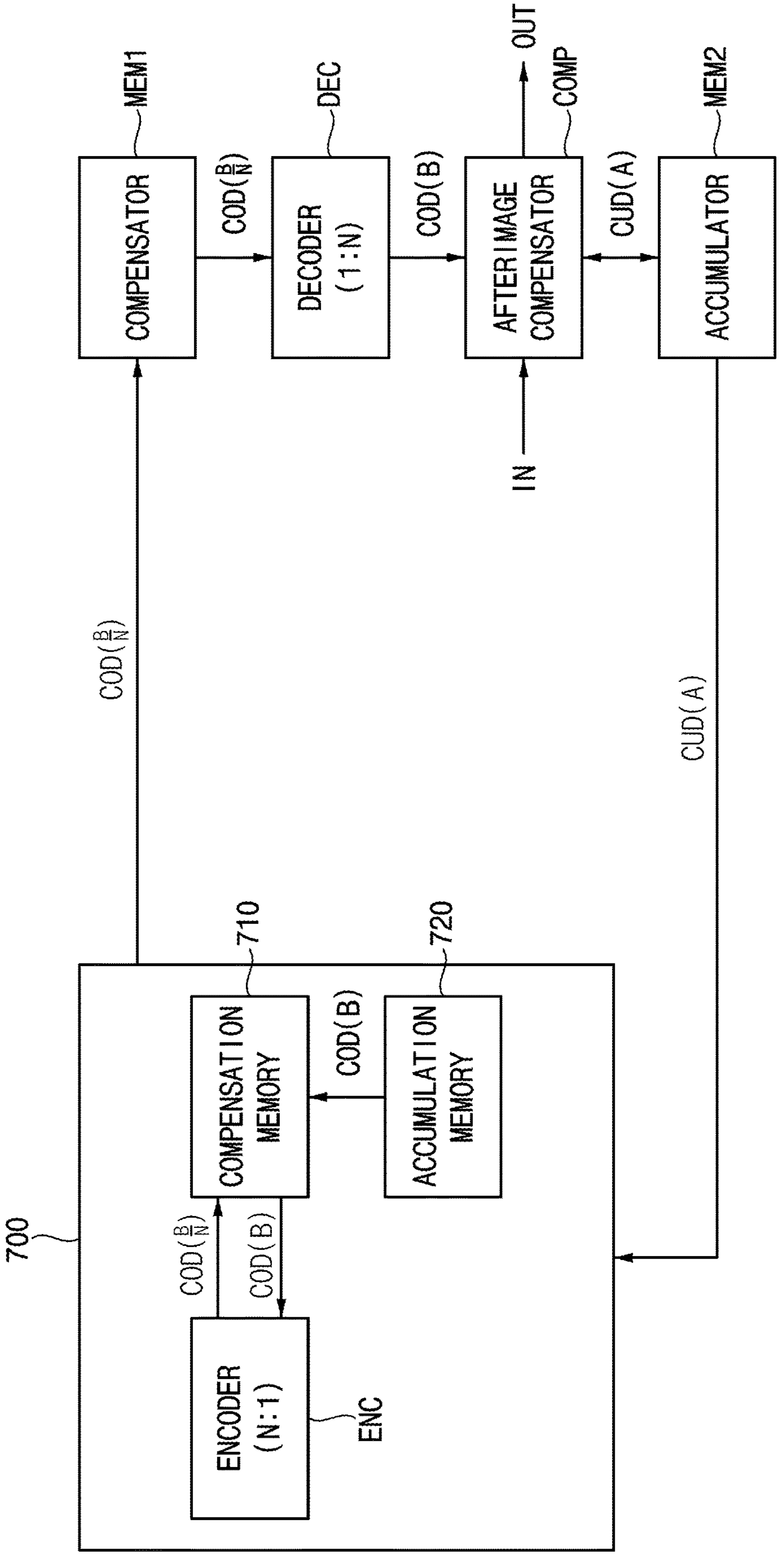
FIG. 8 is a block diagram illustrating a display driver of a display apparatus according to an embodiment of the present inventive concept.
Figure 9:
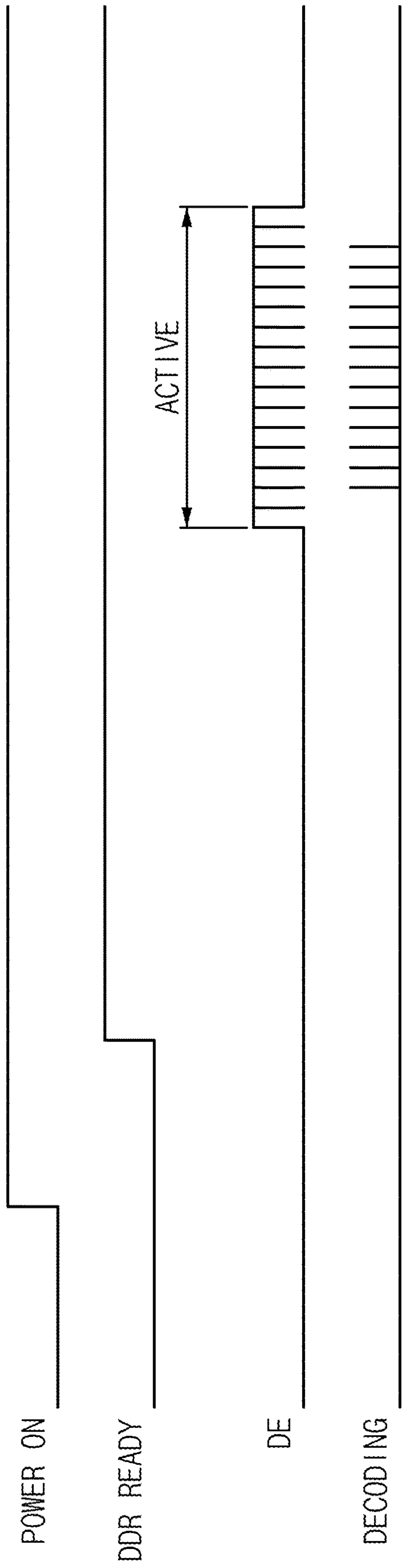
FIG. 9 is a timing diagram illustrating operation timings of an encoder and a decoder of FIG. 8.

FIG. 8 is a block diagram illustrating a display driver of a display apparatus according to an embodiment of the present inventive concept. FIG. 9 is a timing diagram illustrating operation timings of an encoder ENC and a decoder DEC of FIG. 8.

The display apparatus according to the present embodiment is substantially the same as the display apparatus of the previous embodiment explained referring to FIGS. 1 to 5B except for the position and the operation of the encoder. Thus, the same reference numerals will be used to refer to the same or like parts as those described in the previous embodiment of FIGS. 1 to 5B and any redundant explanation concerning the above elements will be omitted.

Referring to FIGS. 1, 4 to 5B, 8 and 9, the display driver may include a nonvolatile memory 700, a compensator MEM1, a decoder DEC, an afterimage compensator COMP and an accumulator MEM2.

The nonvolatile memory 700 may include an accumulation memory 720 storing accumulated stress data CUD(A), a compensation memory 710 storing compensation data COD(B) corresponding to the accumulated stress data CUD (A) and an encoder ENC encoding the compensation data COD(B) of the compensation memory 710 to generate encoded compensation data COD(B/N).

The encoder ENC may output the encoded compensation data COD(B/N) to the compensation memory 710. The compensation memory 710 may store the encoded compensation data COD(B/N). For example, the encoder ENC may operate N:1 encoding operation. Herein, N is a real number greater than one. For example, N may be an integer greater than one.

A structure and operation of the encoder ENC of FIG. 4 may be applied to the present embodiment.

The compensator MEM1 may receive the encoded compensation data COD(B/N) from the nonvolatile memory 700. The compensator MEM1 may store the encoded compensation data COD(B/N). The compensator MEM1 may output the encoded compensation data COD(B/N) to the decoder DEC.

The decoder DEC may receive the encoded compensation data COD(B/N) from the compensator MEM1. The decoder DEC may decode the encoded compensation data COD(B/N) to generate decoded compensation data COD(B). The decoder DEC may output the decoded compensation data COD(B) to the afterimage compensator COMP.

The afterimage compensator COMP may receive the decoded compensation data COD(B) from the decoder DEC. The afterimage compensator COMP may compensate the input image data IN based on the decoded compensation data COD(B) to generate output image data OUT. For example, the afterimage compensator COMP may add compensation values of the decoded compensation data COD(B) to the input image data IN to generate the output image data OUT. For example, the afterimage compensator COMP may operate the afterimage compensation in a unit of the pixel PX.

The accumulator MEM2 may store the accumulated stress data CUD(A) generated by accumulating the input image data IN provided to the afterimage compensator COMP. The accumulator MEM2 may output the accumulated stress data CUD(A) to the nonvolatile memory 700.

The display driver may further include the volatile memory. The compensator MEM1 and the accumulator MEM2 may be included in the volatile memory. Alternatively, the compensator MEM1 may be included in a first volatile memory and the accumulator MEM2 may be included in a second volatile memory different from the first volatile memory.

The encoder ENC may apply the N:1 encoding operation, the decoder DEC may apply 1:N decoding operation, a size of the decoded compensation data may be B, a size of the encoded compensation data generated by the encoder ENC and stored in the compensation memory 710 of the nonvolatile memory 700 may be B/N, and the encoded compensation data stored in the compensator MEM1 may be B/N.

As such, the size of the encoded compensation data received by the compensator MEM1 of the volatile memory is B/N so that the bandwidth of the compensator MEM1 may be reduced by 1/N compared to a case where the N:1 encoding operation is not operated.

Where a size of the accumulated stress data stored in the accumulator MEM2 is A, a size of the encoded accumulated stress data stored in the nonvolatile memory 700 may be A/N.

As such, the accumulated stress data may be stored in the nonvolatile memory 700 without reducing the size so that the accumulated raw data accumulated for the after image compensation may be well maintained.

As shown in FIG. 9, in the present embodiment, the decoder DEC may decode the encoded compensation data COD(B/N) in an active period ACTIVE when the data are written to the pixels PX of the display panel 100. For example, the decoder DEC may decode the encoded compensation data COD(B/N) in the active period ACTIVE in synchronization with a data enable signal DE.

In the present embodiment, the encoder ENC is disposed in the nonvolatile memory 700 so that the compensation data COD(B) may be encoded regardless of an operation timing of the display panel 100.

According to the present embodiment, at least one of the accumulated stress data CUD and the compensation data COD used for afterimage compensation may be encoded and the afterimage compensator COMP may operate the afterimage compensation using the decoded compensation data. Thus, the bandwidth limitation of the volatile memory MEM1 and MEM2 may be overcome.

Accordingly, any constraint on the resolution of the compensation data COD and the accumulated stress data CUD due to bandwidth limitation of the volatile memory MEM1 and MEM2 may be prevented. Thus, the quality of the afterimage compensation may be maintained and the deterioration of the display quality of the display panel 100 may be prevented.

The present disclosure overcomes the bandwidth limitation of the volatile memory MEM1 and MEM2 without adding extra volatile memory, so that the manufacturing cost of the display apparatus may not be increased.

Figure 10:
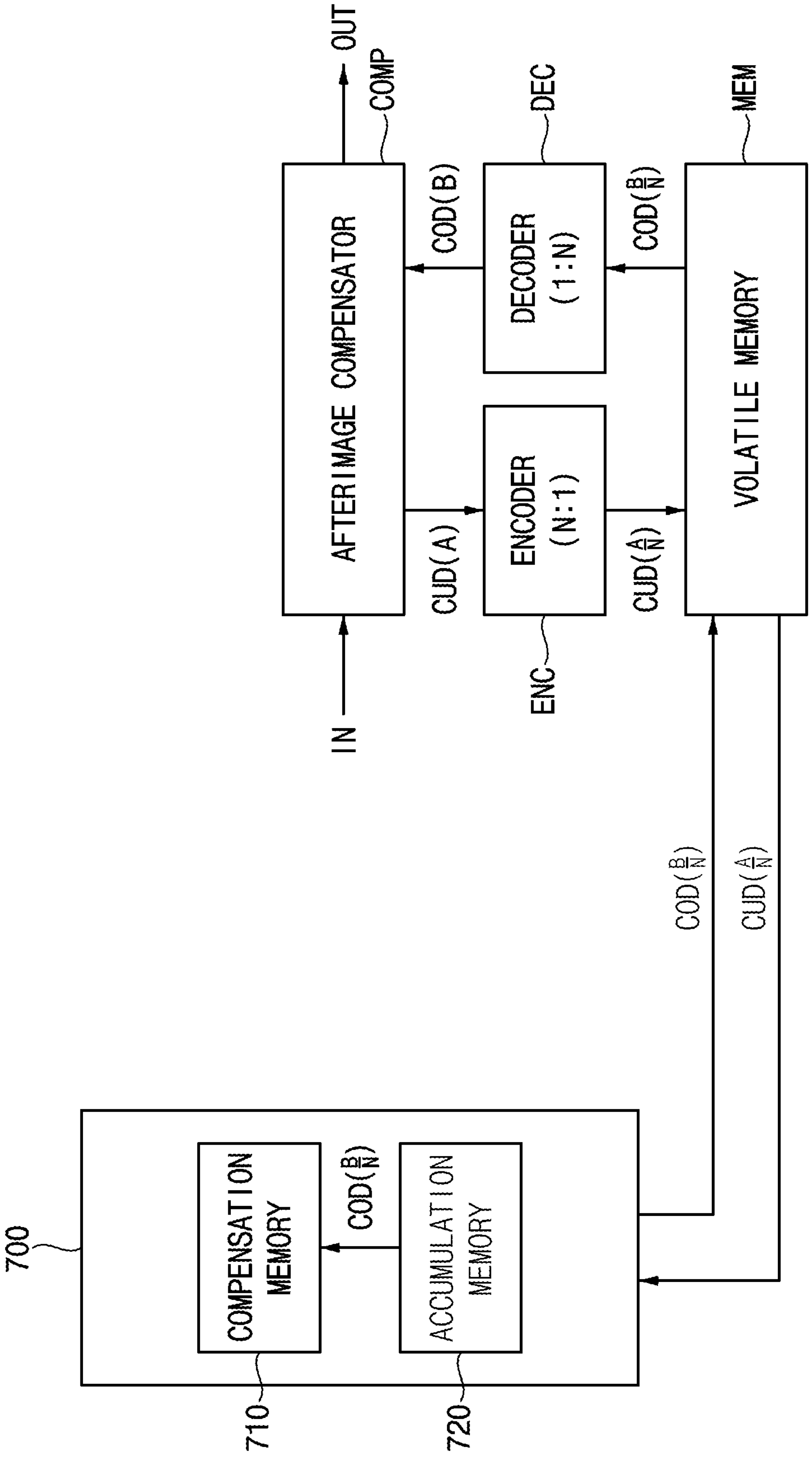
FIG. 10 is a block diagram illustrating a display driver of a display apparatus according to an embodiment of the present inventive concept.
Figure 11:
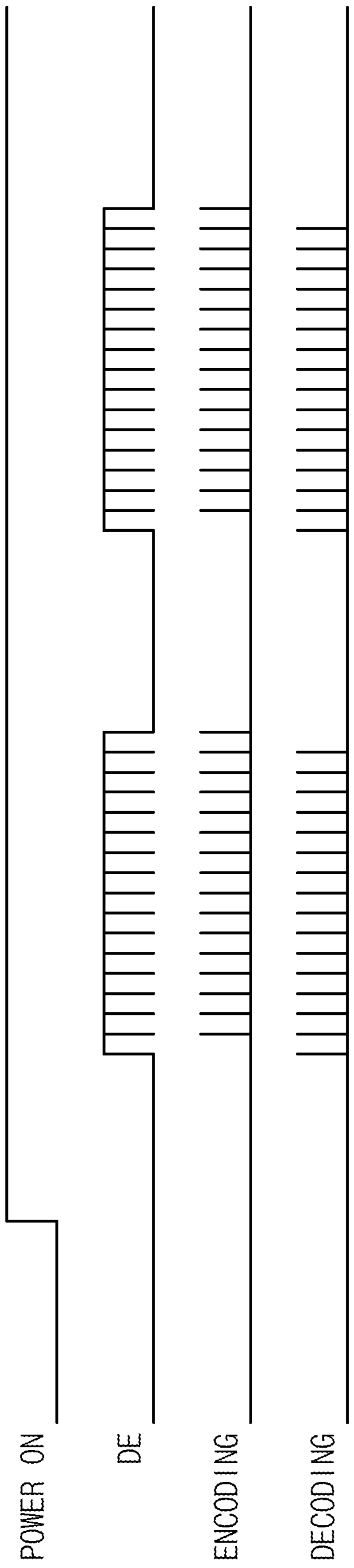
FIG. 11 is a timing diagram illustrating operation timings of an encoder and a decoder of FIG. 10.

FIG. 10 is a block diagram illustrating a display driver of a display apparatus according to an embodiment of the present inventive concept. FIG. 11 is a timing diagram illustrating operation timings of an encoder ENC and a decoder DEC of FIG. 10.

The display apparatus according to the present embodiment is substantially the same as the display apparatus of the previous embodiment explained referring to FIGS. 1 to 5B except for the position and the operation of the encoder. Thus, the same reference numerals will be used to refer to the same or like parts as those described in the previous embodiment of FIGS. 1 to 5B and any redundant explanation concerning the above elements will be omitted.

Referring to FIGS. 1, 4 to 5B, 10 and 11, the display driver may include an afterimage compensator COMP, an encoder ENC, a volatile memory MEM, a nonvolatile memory 700 and a decoder DEC.

The afterimage compensator COMP may receive decoded compensation data COD(B) from the decoder DEC. The afterimage compensator COMP may process input image data IN based on the decoded compensation data COD(B) to generate output image data OUT. For example, the afterimage compensator COMP may add compensation values of the decoded compensation data COD(B) to the input image data IN to generate the output image data OUT. For example, the afterimage compensator COMP may operate on the afterimage compensation on a unit of the pixel PX.

The encoder ENC may encode the accumulated stress data CUD(A) which are generated by accumulating the input image data IN to generate encoded accumulated stress data CUD(A/N). The encoder ENC may output the encoded accumulated stress data CUD(A/N) to the volatile memory MEM. For example, the encoder ENC may operate N:1 encoding operation. Herein, N is a real number greater than one. For example, N may be an integer greater than one.

A structure and an operation of the encoder ENC of FIG. 4 may be applied to the present embodiment.

The volatile memory MEM may store the encoded accumulated stress data CUD(A/N).

The nonvolatile memory 700 may receive the encoded accumulated stress data CUD(A/N) from the volatile memory MEM. The nonvolatile memory 700 may store the encoded accumulated stress data CUD(A/N) and encoded compensation data COD(B/N) corresponding to the encoded accumulated stress data CUD(A/N). The nonvolatile memory 700 may output the encoded compensation data COD(B/N) to the volatile memory MEM.

For example, the nonvolatile memory 700 may include a compensation memory 710 storing the encoded compensation data COD(B/N) and an accumulation memory 720 storing the encoded accumulated stress data CUD(A/N). The compensation memory 710 and the accumulation memory 720 may refer to areas allocated within the same memory or may refer to different memories.

The volatile memory MEM may receive the encoded compensation data COD(B/N) from the nonvolatile memory 700. The volatile memory MEM may store the encoded compensation data COD(B/N). The volatile memory MEM may output the encoded compensation data COD(B/N) to the decoder DEC.

The decoder DEC may receive the encoded compensation data COD(B/N) from the volatile memory MEM. The decoder DEC may decode the encoded compensation data COD(B/N) to generate decoded compensation data COD (B). The decoder DEC may output the decoded compensation data COD(B) to the afterimage compensator COMP.

The encoder ENC may apply the N:1 encoding operation, the decoder DEC may apply the 1:N decoding operation, a size of the decoded compensation data may be B, a size of the encoded compensation data stored in the nonvolatile memory 700 may be B/N, and the encoded compensation data stored in the volatile memory MEM may be B/N.

As such, the size of the encoded compensation data received by the volatile memory MEM is B/N so that the bandwidth of the volatile memory MEM may be reduced by 1/N compared to a case where the N:1 encoding operation is not performed.

When a size of the accumulated stress data generated by accumulating the input image data IN is A, a size of the encoded accumulated stress data stored in the nonvolatile memory 700 may be A/N and a size of the encoded accumulated stress data stored in the volatile memory MEM may be A/N.

As such, the encoded accumulated stress data CUD(A/N) and the encoded compensation data COD(B/N) are stored in the nonvolatile memory 700 so that the size of the nonvolatile memory 700 may be reduced.

As shown in FIG. 11, in the present embodiment, the encoder ENC may encode the accumulated stress data CUD(A) in an active period ACTIVE when data are written to the pixels PX of the display panel 100. For example, the encoder ENC may encode the accumulated stress data CUD(A) in the active period ACTIVE in synchronization with a data enable signal DE.

In addition, the decoder DEC may decode the encoded compensation data COD(B/N) in the active period ACTIVE when the data are written to the pixels PX of the display panel 100. For example, the decoder DEC may decode the encoded compensation data COD(B/N) in the active period ACTIVE in synchronization with the data enable signal DE.

According to the present embodiment, at least one of the accumulated stress data CUD and the compensation data COD used for afterimage compensation may be encoded and the afterimage compensator COMP may operate the afterimage compensation using the decoded compensation data. Thus, the bandwidth limitation of the volatile memory MEM may be overcome.

Accordingly, any constraint on the resolution of the compensation data COD and the accumulated stress data CUD due to bandwidth limitation of the volatile memory MEM may be prevented. Thus, the quality of the afterimage compensation may be maintained and the deterioration of the display quality of the display panel 100 may be prevented.

to the present disclosure overcomes the bandwidth limitation of the volatile memory MEM without adding extra volatile memory, so that the manufacturing cost of the display apparatus may not be increased.

Figure 12:
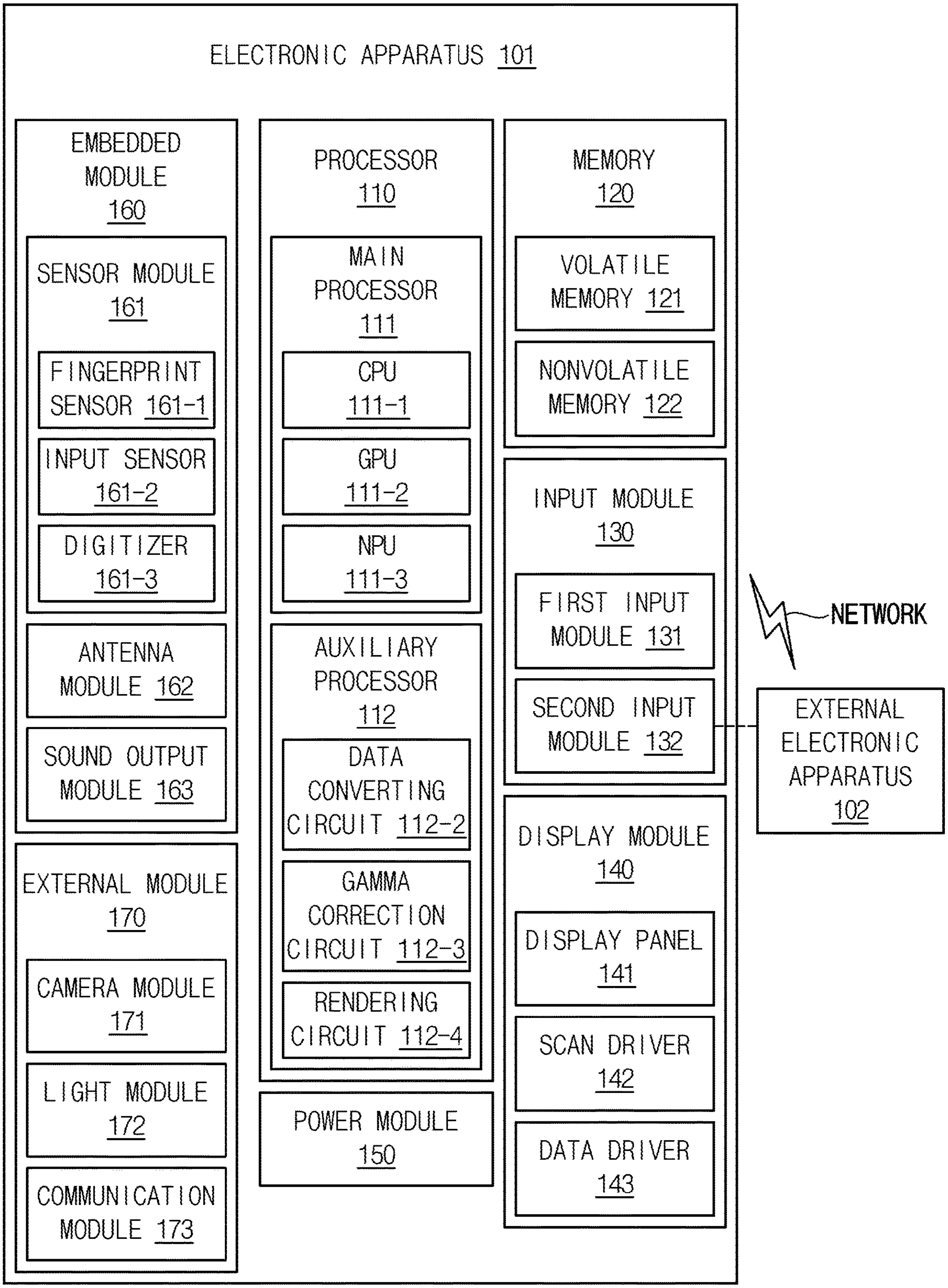
FIG. 12 is a block diagram illustrating an electronic apparatus according to an embodiment of the present inventive concept.

FIG. 12 is a block diagram illustrating an electronic apparatus according to an embodiment of the present inventive concept.

Referring to FIGS. 1 to 12, an electronic apparatus 101 outputs various information through a display module 140 in an operating system. When a processor 110 executes an application stored in a memory 120, the display module 140 provides application information to a user through a display panel 141.

The processor 110 obtains an external input through an input module 130 or a sensor module 161 and executes an application corresponding to the external input. For example, when the user selects a camera icon displayed on the display panel 141, the processor 110 obtains a user input through an input sensor 161-2 and activates a camera module 171. The processor 110 transfers image data corresponding to a captured image obtained through the camera module 171 to the display module 140. The display module 140 may display an image corresponding to the captured image through the display panel 141.

In an embodiment, when a personal information authentication is executed in the display module 140, a fingerprint sensor 161-1 obtains input fingerprint information as input data. The processor 110 compares input data obtained through the fingerprint sensor 161-1 with authentication data stored in the memory 120, and executes an application according to a comparison result. The display module 140 may display information executed according to application logic through the display panel 141.

In an embodiment, when a music streaming icon displayed on the display module 140 is selected, the processor 110 obtains a user input through the input sensor 161-2 and activates a music streaming application stored in the memory 120. When a music execution command is input in the music streaming application, the processor 110 activates a sound output module 163 to provide sound information corresponding to the music execution command to the user.

In the above, the operation of the electronic apparatus 101 is briefly described. Hereinafter, a configuration of the electronic apparatus 101 is described in detail. Some of elements of the electronic apparatus 101 described later may be integrated and provided as one element, or one element may be separated as two or more elements.

The electronic apparatus 101 may communicate with an external electronic apparatus 102 through a network (e.g. a short-range wireless communication network or a long-range wireless communication network). According to an embodiment, the electronic apparatus 101 may include the processor 110, the memory 120, the input module 130, the display module 140, a power module 150, an embedded module 160, and an external module 170. According to an embodiment, in the electronic apparatus 101, at least one of the above-described elements may be omitted or one or more other apparatus may be added. According to an embodiment, some of the above-described elements (e.g., the sensor module 161, an antenna module 162 or the sound output module 163) may be integrated into another element (e.g. the display module 140).

The processor 110 may execute software to control at least one other element (e.g. hardware or software element) of the electronic apparatus 101 connected to the processor 110 and to perform various data processing or operations. According to an embodiment, as at least part of the data processing or the operations, the processor 110 may receive instructions or data from other elements (e.g. the input module 130, the sensor module 161 or a communication module 173) in a volatile memory 121, may process the instructions or data stored in the volatile memory 121 and may store result data of the processing in a nonvolatile memory 122.

The processor 110 may include a main processor 111 and an auxiliary processor 112. The main processor 111 may include at least one of a central processing unit (CPU) 111-1 and an application processor (AP). The main processor 111 may further include any one or more of a graphic processing unit (GPU) 111-2, a communication processor (CP) and an image signal processor (ISP). The main processor 111 may further include a neural processing unit (NPU) 111-3. The neural network processing unit 111-3 is a processor specialized in processing an artificial intelligence model. The artificial intelligence model may be generated through a machine learning. The artificial intelligence model may include a plurality of artificial neural network layers. The artificial neural network may be one of a deep neural network (DNN), a convolutional neural network (CNN), a recurrent neural network (RNN), a restricted boltzmann machine (RBM), a deep belief network (DBN), a bidirectional recurrent deep neural network (BRDNN) and a deep Q-networks or a combination of two or more of the above. However, the artificial neural network is not limited to the above examples. The artificial intelligence model may include software structures, in addition to hardware structures or instead of the hardware structures. At least two of the above-described processing units and the above-described processors may be implemented as an integrated element (e.g. a single chip) or each may be implemented as independent elements (e.g. in a plurality of chips).

The auxiliary processor 112 may include a controller. The controller may include an interface conversion circuit and a timing control circuit. The controller receives an image signal from the main processor 111, converts a data format of the image signal to meet interface specifications with the display module 140, and outputs image data. The controller may output various control signals for driving the display module 140.

The auxiliary processor 112 may further include a data converting circuit 112-2, a gamma correction circuit 112-3 and a rendering circuit 112-4. The data converting circuit 112-2 may receive the image data from the controller and may compensate the image data such that the image is displayed with a desired luminance according to characteristics of the electronic apparatus 101 or a user setting or may convert the image data to reduce a power consumption or compensate for afterimages. The gamma correction circuit 112-3 may convert the image data or a gamma reference voltage such that the image displayed on the electronic apparatus 101 has desired gamma characteristics. The rendering circuit 112-4 may receive the image data from the controller and may render the image data based on a pixel arrangement of the display panel 141 included in the electronic apparatus 101. At least one of the data converting circuit 112-2, the gamma correction circuit 112-3 and the rendering circuit 112-4 may be integrated into another element (e.g. the main processor 111 or the controller). At least one of the data converting circuit 112-2, the gamma correction circuit 112-3 and the rendering circuit 112-4 may be integrated into a data driver 143 to be described later.

The memory 120 may store various data used by at least one element (e.g. the processor 110 or the sensor module 161) of the electronic apparatus 101 and input data or output data for commands related thereto. The memory 120 may include at least one of the volatile memory 121 and the nonvolatile memory 122.

The input module 130 may receive commands or data for the elements (e.g. the processor 110, the sensor module 161 or the sound output module 163) of the electronic apparatus 101 from the outside of the electronic apparatus 101 (e.g. the user or the external electronic apparatus 102).

The input module 130 may include a first input module 131 for receiving commands or data from the user and a second input module 132 for receiving commands or data from the external electronic apparatus 102. The first input module 131 may include a microphone, a mouse, a keyboard, a key (e.g. a button) or a pen (e.g. a passive pen or an active pen). The second input module 132 may support a designated protocol capable of connecting to the external electronic apparatus 102 by wire or wirelessly. According to an embodiment, the second input module 132 may include a high definition multimedia interface (HDMI), a universal serial bus (USB) interface, an SD card interface or an audio interface. The second input module 132 may include a connector physically connected to the external electronic apparatus 102, for example, an HDMI connector, a USB connector, an SD card connector, or an audio connector (e.g. a headphone connector).

The display module 140 visually provides information to the user. The display module 140 may include the display panel 141, a scan driver 142 and the data driver 143. The display module 140 may further include a window, a chassis and a bracket to protect the display panel 141.

The display panel 141 may include a liquid crystal display panel, an organic light emitting display panel or an inorganic light emitting display panel. A type of the display panel 141 is not particularly limited. The display panel 141 may be a rigid type or a flexible type capable of being rolled or folded. The display module 140 may further include a supporter or a heat dissipation member supporting the display panel 141.

The scan driver 142 may be mounted on the display panel 141 as a driving chip. Alternatively, the scan driver 142 may be integrated on the display panel 141. For example, the scan driver 142 may include an amorphous silicon TFT gate driver circuit (ASG) integrated on the display panel 141, a low temperature polycrystaline silicon (LTPS) TFT gate driver circuit integrated on the display panel 141, or an oxide semiconductor TFT gate driver circuit (OSG) integrated on the display panel 141. The scan driver 142 receives a control signal from the controller and outputs the scan signals to the display panel 141 in response to the control signal.

The display panel 141 may further include a light emission driver. The light emission driver outputs a light emission control signal to the display panel 141 in response to a control signal received from the controller. The light emission driver may be formed independently from the scan driver 142. Alternatively, the light emission driver and the scan driver 142 may be integrally formed.

The data driver 143 receives a control signal from the controller and converts the image data into an analog voltage (e.g. the data voltage) and output the data voltages to the display panel 141 in response to the control signal.

The data driver 143 may be integrated into another element (e.g. the controller). The functions of the interface conversion circuit and the timing control circuit of the controller described above may be integrated into the data driver 143.

The display module 140 may further include a voltage generating circuit. The voltage generating circuit may output various voltages for driving the display panel 141.

The power module 150 supplies power to elements of the electronic apparatus 101. The power module 150 may include a battery which supplies power. The battery may include a non-rechargeable primary cell, a rechargeable secondary cell or a fuel cell. The power module 150 may include a power management integrated circuit (PMIC). The PMIC supplies optimized power to each of the above-described modules and modules described later. The power module 150 may include a wireless power transmission/reception member electrically connected to the battery. The wireless power transmission/reception member may include a plurality of antenna radiators in a form of coils.

The electronic apparatus 101 may further include the embedded module 160 and the external module 170. The embedded module 160 may include the sensor module 161, the antenna module 162 and the sound output module 163. The external module 170 may include the camera module 171, a light module 172 and the communication module 173.

The sensor module 161 may detect an input by a user's body or an input by the pen among the first input module 131, and generate an electrical signal or data value corresponding to the input. The sensor module 161 may include at least one of the fingerprint sensor 161-1, the input sensor 161-2 and a digitizer 161-3.

The fingerprint sensor 161-1 may generate a data value corresponding to a user's fingerprint. The fingerprint sensor 161-1 may include one of an optical fingerprint sensor or a capacitive fingerprint sensor.

The input sensor 161-2 may generate data values corresponding to coordinate information of the input by the user's body or the input by the pen. The input sensor 161-2 generates a capacitance change due to an input as a data value. The input sensor 161-2 may detect an input by the passive pen or transmit/receive data to/from the active pen.

The input sensor 161-2 may measure biosignals such as a blood pressure, a moisture, or a body fat. For example, when a user touches a part of his body to a sensor layer or a sensing panel and does not move for a certain period of time, the input sensor 161-2 may detect the biosignal based on a change in an electric field caused by the part of the body that is touching so that the display module 140 may output user's desired information.

The digitizer 161-3 may generate a data value corresponding to the coordinate information input by the pen. The digitizer 161-3 generates an amount of electromagnetic change by the input as a data value. The digitizer 161-3 may detect an input by the passive pen or transmit/receive data to/from the active pen.

At least one of the fingerprint sensor 161-1, the input sensor 161-2 and the digitizer 161-3 may be formed as a sensor layer on the display panel 141 through a continuous process. The fingerprint sensor 161-1, the input sensor 161-2 and the digitizer 161-3 may be disposed on the display panel 141. At least one of the fingerprint sensor 161-1, the input sensor 161-2 and the digitizer 161-3, for example, the digitizer 161-3, may be disposed under the display panel 141.

At least two or more of the fingerprint sensor 161-1, the input sensor 161-2 and the digitizer 161-3 may be integrated into the sensing panel through the same process. When at least two or more of the fingerprint sensor 161-1, the input sensor 161-2 and the digitizer 161-3 are integrated into the sensing panel, the sensing panel may be disposed between the display panel 141 and a window disposed over an upper surface of the display panel 141. According to an embodiment, the sensing panel may be disposed on the window. The present inventive concept may not be limited to a position of the sensing panel.

At least one of the fingerprint sensor 161-1, the input sensor 161-2 and the digitizer 161-3 may be embedded in the display panel 141. For example, at least one of the fingerprint sensor 161-1, the input sensor 161-2 and the digitizer 161-3 is formed simultaneously with the display panel 141 through a process of forming elements included in the display panel 141 (e.g. light emitting elements, transistors, etc.).

In addition, the sensor module 161 may generate an electrical signal or a data value corresponding to an internal state or an external state of the electronic apparatus 101. For example, the sensor module 161 may further include a gesture sensor, a gyro sensor, a barometric pressure sensor, a magnetic sensor, an acceleration sensor, a grip sensor, a proximity sensor, a color sensor, an IR (infrared) sensor, a biosensor, a temperature sensor, a humidity sensor or an illuminance sensor.

The antenna module 162 may include one or more antennas for transmitting a signal or power to outside or receiving a signal or power from outside. According to an embodiment, the communication module 173 may transmit a signal to an external electronic apparatus or receive a signal from an external electronic apparatus through an antenna suitable for a communication method. An antenna pattern of the antenna module 162 may be integrated with an element of the display module 140 (e.g. the display panel 141) or the input sensor 161-2.

The sound output module 163 is a device for outputting sound signals to the outside of the electronic apparatus 101. For example, the sound output module 163 may include a speaker used for general purposes such as playing multimedia or recording and a receiver used exclusively for receiving a call. According to an embodiment, the receiver may be formed integrally with or separately from the speaker. A sound output pattern of the sound output module 163 may be integrated with the display module 140.

The camera module 171 may capture still images and moving images. According to an embodiment, the camera module 171 may include one or more lenses, an image sensor or an image signal processor. The camera module 171 may further include an infrared camera capable of determining a presence or an absence of a user, the user's location and the user's gaze.

The light module 172 may provide a light. The light module 172 may include a light emitting diode or a xenon lamp. The light module 172 may operate in conjunction with the camera module 171 or operate independently.

The communication module 173 may support establishment of a wired or wireless communication channel between the electronic apparatus 101 and the external electronic apparatus 102 and communication through the established communication channel. The communication module 173 may include one or both of a wireless communication module such as a cellular communication module, a short-distance wireless communication module, or a global navigation satellite system (GNSS) communication module and a wired communication module such as a local area network (LAN) communication module, or a power line communication module. The communication module 173 may communicate with the external electronic apparatus 102 through a short-range communication network such as Bluetooth, WiFi direct or infrared data association (IrDA) or a long-distance communication network such as a cellular network, the Internet, or a computer network (e.g. LAN or WAN). The various types of communication modules 173 described above may be implemented as a single chip or may be implemented as separate chips.

The input module 130, the sensor module 161 and the camera module 171 may be used to control the operation of the display module 140 in conjunction with the processor 110.

The processor 110 outputs commands or data to the display module 140, the sound output module 163, the camera module 171 or the light module 172 based on the input data received from the input module 130. For example, the processor 110 may generate image data corresponding to input data applied through a mouse or an active pen, and output the generated image data to the display module 140 or the processor 110 may generate command data corresponding to the input data and output the generated command data to the camera module 171 or the light module 172. When input data is not received from the input module 130 for a certain period of time, the processor 110 converts an operation mode of the electronic apparatus 101 into a low power mode or a sleep mode so that a power consumption of the electronic apparatus 101 may be reduced.

The processor 110 outputs commands or data to the display module 140, the sound output module 163, the camera module 171 or the light module 172 based on sensed data received from the sensor module 161. For example, the processor 110 may compare authentication data applied by the fingerprint sensor 161-1 with authentication data stored in the memory 120, and then execute an application according to the comparison result. The processor 110 may execute commands or output corresponding image data to the display module 140 based on the sensed data sensed by the input sensor 161-2 or the digitizer 161-3. When the sensor module 161 includes a temperature sensor, the processor 110 may receive temperature data for the temperature measured from the sensor module 161 and may further perform luminance correction on the image data based on the temperature data.

The processor 110 may receive determined data about the presence or the absence of the user, the user's location and the user's gaze from the camera module 171. The processor 110 may further perform luminance correction on the image data based on the determined data. For example, the processor 110, which determines the presence or the absence of the user through an input from the camera module 171, may display image data having the luminance corrected by the data converting circuit 112-2 or the gamma correction circuit 112-3 to the display module 140.

Some of the above elements may be connected to each other through a communication method between peripheral devices such as a bus, a general purpose input/output (GPIO), a serial peripheral interface (SPI), a mobile industry processor interface (MIPI), or a ultra path interconnect (UPI) link to exchange signals (e.g. commands or data) with each other. The processor 110 may communicate with the display module 140 through an agreed interface. For example, the processor 110 may communicate with the display module 140 through any one of the above communication methods. The present invention may not be limited to the above communication methods.

The electronic apparatus 101 according to various embodiments disclosed in the disclosure may be various types of apparatuses. For example, the electronic apparatus 101 may include at least one of a portable communication apparatus (e.g. a smart phone), a computer apparatus, a portable multimedia apparatus, a portable medical apparatus, a camera, a wearable device and a home appliance. The electronic apparatus 101 according to the embodiment of the disclosure may not be limited to the aforementioned apparatuses.

For example, the display panel 100 of FIG. 1 may correspond to the display panel 141 of FIG. 12. For example, the driving controller 200 of FIG. 1 may correspond to the controller of the auxiliary processor 112 of FIG. 12. For example, the gate driver 300 of FIG. 1 may correspond to the scan driver 142 of FIG. 12. For example, the data driver 500 of FIG. 1 may correspond to the data driver 143 of FIG. 12. For example, the power voltage generator 600 of FIG. 1 may correspond to the power module 150 of FIG. 12. For example, the nonvolatile memory 700 of FIG. 1 may correspond to the nonvolatile memory 122 of FIG. 12.

According to the embodiments of the display driver, at least one of the accumulated stress data and the compensation data used for the afterimage compensation may be encoded so that the bandwidth limitation of the memory may be overcome.

The foregoing is illustrative of the present inventive concept and is not to be construed as limiting thereof. Although a few embodiments of the present inventive concept have been described, those skilled in the art will readily appreciate that many modifications are possible in the embodiments without materially departing from the novel teachings and advantages of the present inventive concept. Accordingly, all such modifications are intended to be included within the scope of the present inventive concept as defined in the claims. In the claims, means-plus-function clauses are intended to cover the structures described herein as performing the recited function and not only structural equivalents but also equivalent structures. Therefore, it is to be understood that the foregoing is illustrative of the present inventive concept and is not to be construed as limited to the specific embodiments disclosed, and that modifications to the disclosed embodiments, as well as other embodiments, are intended to be included within the scope of the appended claims. The present inventive concept is defined by the following claims, with equivalents of the claims to be included therein.

What is claimed is:

1. A display driver comprising:

a first memory configured to store accumulated stress data and compensation data corresponding to the accumulated stress data, the accumulated stress data indicating degrees of pixel deterioration and the compensation data representing values for afterimage compensation based on the accumulated stress data;

an encoder which receives the compensation data from the first memory and generates encoded compensation data;

a decoder which receives the encoded compensation data and generates decoded compensation data; and a compensator which processes input image data based on the decoded compensation data and generates the accumulated stress data.

2. The display driver of claim 1, further comprising a volatile memory, the volatile memory comprising:

a second compensator which stores the encoded compensation data; and an accumulator which stores the accumulated stress data.

3. The display driver of claim 2, wherein when the encoder operates N:1 encoding operation, the decoder operates 1: N decoding operation, and a size of the decoded compensation data inputted to the compensator is B, a size of the compensation data stored in the first memory is B and the encoded compensation data stored in the second compensator is B/N, and wherein N is a real number greater than one.

4. The display driver of claim 3, wherein when a size of the accumulated stress data stored in the accumulator is A, a size of the accumulated stress data stored in the first memory is A.

5. The display driver of claim 1, wherein the encoder encodes the compensation data between a power on timing when a display apparatus is turned on and a memory ready timing when an accumulator is activated.

6. The display driver of claim 5, wherein the decoder decodes the encoded compensation data in an active period during which data are written to pixels of a display panel.

7. The display driver of claim 1, wherein the encoder performs an encoding operation by controlling a quantization factor such that a code length of output data does not exceed a predetermined code length.

8. The display driver of claim 7, wherein the encoder comprises:

a quantizer which stores a data difference between adjacent pixels of input data;

a rate controller which generates the quantization factor based on the code length and the predetermined code length of the output data; and a predictor which generates a prediction value based on the quantization factor and the input data.

9. The display driver of claim 8, wherein the encoder further comprises an operator which adjusts a length of the input data based on the prediction value and outputs the input data to the quantizer.

10. A display driver comprising:

an encoder which encodes accumulated stress data to generate encoded accumulated stress data;

a first memory configured to store the encoded accumulated stress data and encoded compensation data corresponding to the encoded accumulated stress data, the encoded compensation data being an encoded version of compensation data that represents values for afterimage compensation;

a decoder which decodes the encoded compensation data to generate decoded compensation data;

a compensator which processes input image data based on the decoded compensation data and generates the accumulated stress data by accumulating the input image data that is received, the accumulated stress data indicating degrees of pixel deterioration.

11. The display driver of claim 10, further comprising a second compensator which stores the encoded compensation data received from the first memory, wherein when the encoder operates N: 1 encoding operation, the decoder operates 1: N decoding operation, and a size of the decoded compensation data inputted to the compensator is B, a size of the encoded compensation data stored in the first memory is B/N and the encoded compensation data stored in the second compensator is B/N, and wherein N is a real number greater than one.

12. The display driver of claim 11, wherein when a size of the accumulated stress data stored in an accumulator is A, a size of the encoded accumulated stress data stored in the first memory is A/N.

13. The display driver of claim 10, wherein the encoder encodes the accumulated stress data in a blank period between active periods during which data are written to pixels of a display panel.

14. The display driver of claim 13, wherein the decoder decodes the encoded compensation data in the active period.

15. A display driver comprising:

a first memory including an accumulation memory configured to store accumulated stress data that indicates degrees of pixel deterioration, a compensation memory configured to store compensation data for afterimage compensation based on the accumulated stress data, and an encoder which encodes the compensation data of the compensation memory to generate encoded compensation data;

a decoder which decodes the encoded compensation data to generate decoded compensation data;

a compensator which processes input image data based on the decoded compensation data and generates the accumulated stress data by accumulating the input image data that is received.

16. The display driver of claim 15, further comprising a second compensator which receives the encoded compensation data from the first memory and to store the encoded compensation data, wherein when the encoder operates N:1 encoding operation, the decoder operates 1: N decoding operation, and a size of the decoded compensation data inputted to the compensator is B, a size of the encoded compensation data generated by the encoder and stored in the compensation memory of the first memory is B/N and the encoded compensation data stored in the second compensator is B/N, and wherein N is a real number greater than one.

17. The display driver of claim 16, wherein when a size of the accumulated stress data stored in an accumulator is A, a size of the accumulated stress data stored in the accumulation memory of the first memory is A.

18. The display driver of claim 15, wherein the encoder encodes the compensation data regardless of an operation timing of a display panel, and wherein the decoder decodes the encoded compensation data in an active period during which data are written to pixels of the display panel.

19. A display driver comprising:

a compensator which processes input image data;

an encoder which encodes accumulated stress data generated by accumulating the input image data that is received by the compensator to generate encoded accumulated stress data;

a volatile memory configured to store the encoded accumulated stress data; and a first memory configured to store the encoded accumulated stress data received from the volatile memory and encoded compensation data corresponding to the encoded accumulated stress data, wherein the encoded compensation data is an encoded version of compensation data for afterimage compensation based on the accumulated stress data;

wherein the volatile memory is configured to receive the encoded compensation data from the first memory, further comprising:

a decoder which decodes the encoded compensation data received from the volatile memory to generate decoded compensation data.

20. The display driver of claim 19, wherein when the encoder operates N:1 encoding operation, the decoder operates 1: N decoding operation, and a size of the decoded compensation data inputted to the compensator is B, a size of the encoded compensation data stored in the first memory is B/N and the encoded compensation data stored in the volatile memory is B/N, and wherein N is a real number greater than one.

21. The display driver of claim 20, wherein when a size of the accumulated stress data generated by accumulating the input image data is A, a size of the encoded accumulated stress data stored in the first memory is A/N and a size of the encoded accumulated stress data stored in the volatile memory is A/N.

22. The display driver of claim 19, wherein the encoder encodes the accumulated stress data in an active period during which data are written to pixels of a display panel, and wherein the decoder decodes the encoded compensation data in the active period.

* * * * *